Nov. 21, 1933. F. H. OWENS 1,936,206
DISSOLVER FOR MOTION PICTURE CAMERAS
Filed Nov. 6, 1929 2 Sheets-Sheet 1
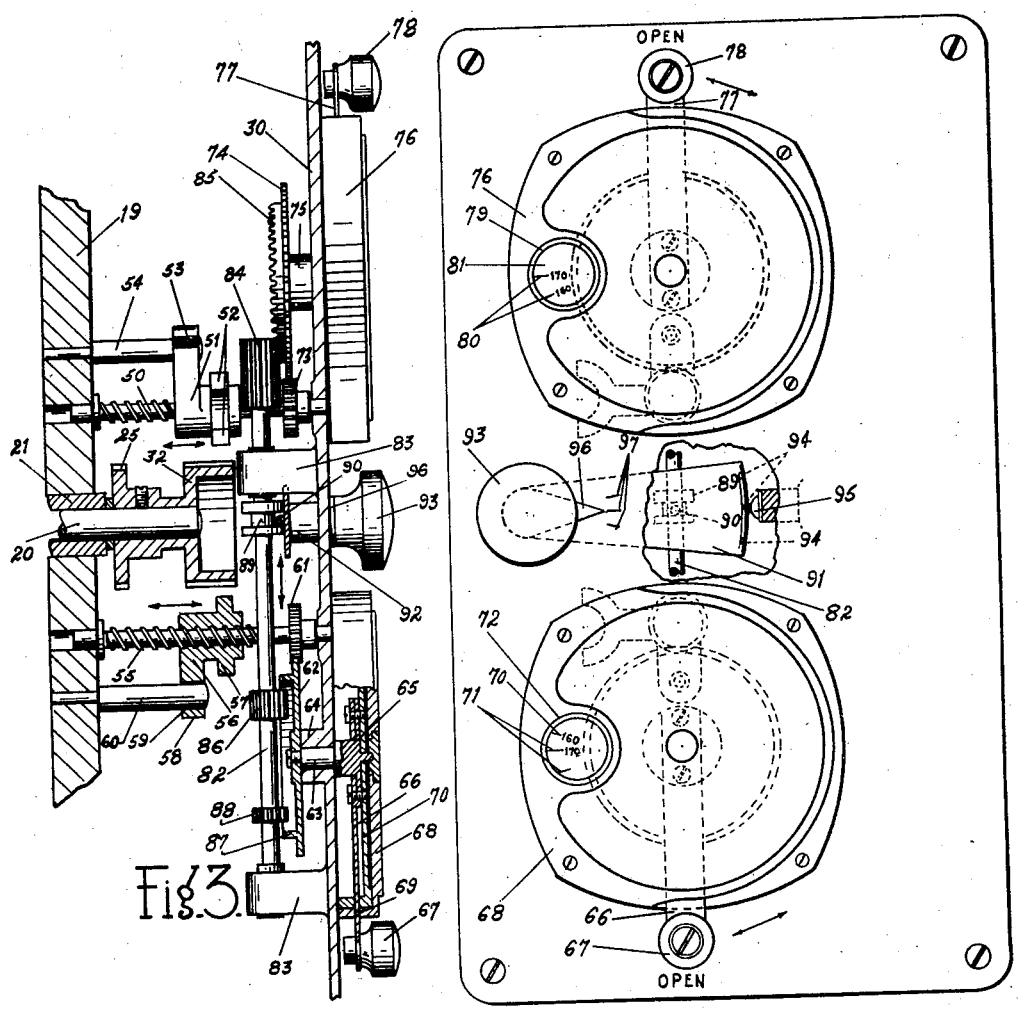
INVENTOR.
FREEMAN H. OWENS.
BY Philip S. Hopkins
ATTORNEY.

Nov. 21, 1933.   F. H. OWENS   1,936,206
DISSOLVER FOR MOTION PICTURE CAMERAS
Filed Nov. 6, 1929   2 Sheets-Sheet 2

INVENTOR.
FREEMAN H. OWENS
BY Philip S. Hopkins
ATTORNEY.

Patented Nov. 21, 1933

1,936,206

UNITED STATES PATENT OFFICE 1,936,206

DISSOLVER FOR MOTION PICTURE
CAMERAS

Freeman H. Owens, New York, N. Y.

Application November 6, 1929. Serial No. 405,233

14 Claims. (Cl. 88—16)

My invention relates to a dissolving means for motion picture cameras and particularly for a multiple lens camera.

In the art of motion pictures, it frequently is desirable that at the beginning or end of a scene, or a particular part of the picture, the view or object being photographed be dissolved or faded in or out as the case may be. That is, to make it appear on the screen when the picture is being projected that one scene gradually fades or disappears or gradually appears on the screen. This effect is often used in changing from one scene to another in such manner that one scene will fade out and the next succeeding scene will fade in almost simultaneously so that there will be no appreciable interruption in the continuity of the picture.

I have invented a camera provided with means for producing this dissolving or fading effect and in which camera I have provided a plurality of aligned lenses, in this instance, two, through which the images may be selectively photographed on a film traveling through the camera, and mechanism whereby the taking of the pictures may be shifted from one lens to the other without interruption and in such a manner as to dissolve or fade out the picture being photographed through one lens and dissolve or fade in the picture to be photographed through the other lens. Such a camera is particularly useful and convenient where it is desired during the taking of a motion picture to shift from a long view to a close up of a particular portion of the scene or vice-versa. This may be accomplished by providing a long focus lens and a short focus lens on the camera.

A camera of this type also lends itself readily to the practice of trick photography having double exposure effects, upper and lower level effects, and the quick changing from close ups to distant scenes, and other manipulation of exposures.

One object of my invention is to provide a double lens camera with mechanism for effecting the changing from one lens to another during the operation of the camera by means of devices simple in construction and easy of operation.

Other objects of my invention will appear as the description now proceeds, reference being had to the figures of the accompanying drawings forming a part of this application and wherein like reference numerals indicate like parts.

In the drawings:—

Figure 1 is a side view of a motion picture camera equipped with my invention.

Figure 2 is a detail elevational view of the controlling panel and dials located on the rear of the camera.

Figure 3 is a detailed sectional view illustrating a portion of the shifting means employed in the dissolver mechanism of my camera.

Figures 4, 5:
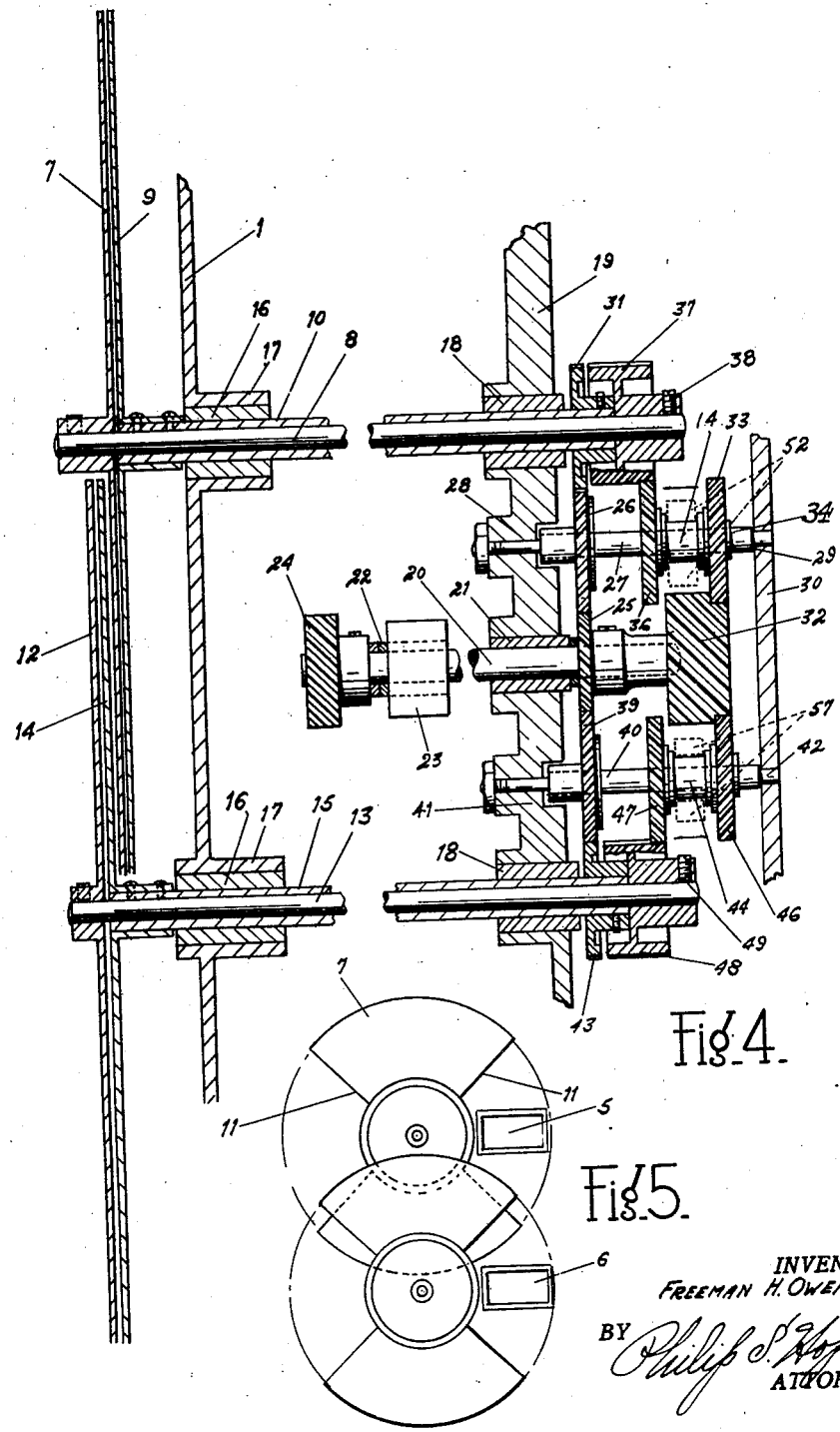
Figure 4 is a detail cross sectional view illustrating the dissolver mechanism.
Figure 5 is a detail front view illustrating diagrammatically, the arrangement of shutters involved in my apparatus.

Reference numeral 1 indicates generally a motion picture camera of a type embodying my invention and carrying the usual film magazine 2. The camera 1 is preferably provided with two mounted lenses 3 and 4, one a long focus lens and the other a short focus lens. These lenses are arranged in vertical alignment one above the other and register with exposure openings 5 and 6 respectively in the camera 1 and illustrated diagrammatically in Figure 5. It will be understood of course, that the film is suitably moved through the camera out of and to the magazine 2 past the exposure openings 5 and 6, by any suitable film moving mechanism.

Shutters are provided for each of the exposure apertures 5 and 6, such shutters being illustrated clearly in Figures 4 and 5. The shutter operating in connection with the aperture 5 comprises a shutter blade 7, suitably fixed upon a rotatable shaft 8, and a blade 9 suitably fixed upon a sleeve 10 rotatable upon the shaft 8. The blades 7 and 9 are divided substantially into quarters and each blade has a pair of opposite quarter sections cut away as at 11 whereby as the blade rotates the aperture 5 will be alternately covered and uncovered, twice for each complete revolution of the blade 7 or the blade 9. It will be clear also that inasmuch as the blade 7 is rotatable with respect to the blade 9, it may be rotated a quarter turn so that its cut away portions will overlie the uncut portions of the blade 9 thereby forming a complete shutter which when the blades are rotated together, prevents the passage of any light through the exposure aperture 5. The segment portions of the blades are as indicated in Figure 5, slightly larger than the cut out portions. Obviously, of course, the blade 7 may be rotated with respect to the blade 9 any desired amount whereby to vary the size of the shutter openings which pass the exposure aperture 5 during the rotation of the shutter blades thus varying the amount of light which may pass through the exposure aperture 5.

From the foregoing it will be clear that by means of the relatively rotatable segmental shutter blades 7 and 9, a completely closed shutter may be provided with respect to the aperture 5 or a shutter having oppositely disposed open portions of variable size up to one quarter of the circumference of the shutter, may be provided for movement past the exposure aperture 5.

The shutter for the exposure aperture 6 is a duplicate of that just described for the aperture 5 and comprises the outer blade 12 secured upon a rotatable shaft 13 and an inner blade 14 secured upon a sleeve 15 rotatable upon the shaft 13. It will be noted from Figures 4 and 5, that the two shutters overlap each other whereby to conserve space in the camera and to permit the lenses and the exposure apertures being brought closely together. The shafts 8 and 13 and the sleeves 10 and 15 are journaled adjacent their front ends in bushings 16 provided in bearings 17 carried by the front wall of the camera 1. The shafts and sleeves are journaled adjacent their rear ends in bushings 18 mounted in a partition 19 within the camera 1.

Means are provided for simultaneously rotating both of the shutters 7—9 and 12—14, such means comprising a shaft 20 rotatably journaled adjacent one end in a bushing 21 provided in the partition 19 and adjacent its opposite end in a bushing 22 provided in a suitable bearing support 23 mounted in the camera.

One end of the shaft 20 is provided with a helical gear 24 adapted to be rotated and driven by any suitable connection to a source of power such as the motor or the driving mechanism of the camera.

The shaft 20 has secured thereto a helical gear 25 meshing with a helical gear 26 mounted upon a shaft 27 journaled at one end in a bearing 28 suitably provided upon the partition 19, and at its opposite end journalled as at 29 in the wall 30 of the camera 1. The helical gear 26 meshes with a helical gear 31 suitably secured upon the sleeve 10 whereby rotation of the shaft 20 will through the gears 25, 26 and 31 cause the rotation of the sleeve 10 and of the inner shutter blade 9.

Also mounted upon the shaft 20 for rotation therewith, is a relatively wide helical gear 32 meshing with a helical gear 33 secured upon a sleeve 34, loosely mounted on the shaft 27 for rotation with respect to the shaft and for sliding movement thereon. The sleeve 34 has secured thereto, in addition to the helical gear 33, a second helical gear 36 meshing with a relatively wide helical gear 37 secured to the shaft 8 as at 38. Therefore, it will be clear that rotation of the shaft 20 will through the medium of the helical gear 32, the helical gears 33 and 36 and the helical gear 37 cause rotation of shaft 8 and the outer shutter blade 7. The ratio of the driving gears is such that the speed of rotation of the shaft 8 and the sleeve 10 and consequently of the shutter blades 7 and 9, will be the same. It will be clear however, that shifting the sleeve 34 carrying the helical gears 33 and 36, longitudinally on the shaft 27, will result in a rotation of the helical gear 37 and shaft 8 relatively to the sleeve 10 and gear 31 whereby the blade 7 of the shutter will be moved relatively to the blade 9 thereby to open or close the cut out segment of the shutter, depending upon the direction in which the sleeve 34 is moved.

Identical means are provided for the drive of the lower shutter blades 12 and 14, the helical gear 25 on the drive shaft 20 also meshing with a helical gear 39 loosely mounted upon a shaft 40 supported at one end in a bearing 41, provided on the partition 19 and supported at its opposite end as at 42 in the wall 30 of the camera. This gear 39 meshes with a helical gear 43, suitably secured to the sleeve 15 whereby rotation of the shaft 20 will through the gears 25, 39 and 43, cause rotation of the sleeve 15 and of the inner blade 14 of the lower shutter.

Loosely mounted upon the shaft 40 is a sleeve 44 for sliding movement upon and for rotation on the shaft 40. This sleeve 44 has secured thereto a helical gear 46 meshing with the wide helical gear 32. Also secured to the sleeve 44 is a second helical gear 47 meshing with a relatively wide helical gear 48 suitably secured as at 49 to the shaft 13. Obviously, therefore, rotation of the shaft 20 will through the gears 32, 46, 47 and 48 result in rotation of the shaft 13 and the outer shutter blade 12. Here also the operation of the gears is such that the speed of rotation of the shaft 13 and the sleeve 15 and of the shutter blades 12 and 14 is the same. Likewise, it will be clear that sliding movement of the sleeve 44 upon the shaft 40 will through the engagement of the gear 46 with the gear 32 and of gear 47 with the gear 48, result in movement of the shaft 13 relatively to the sleeve 15, whereby the outer blade 12 of the lower shutter may be rotated relatively to the inner blade 14 whereby to open or close the cut out portion of the shutter depending upon the direction of movement of the sleeve 44.

From the foregoing it will be clear that the parts in the positions shown in Figures 4 and 5, i. e., with the closed segments 7 and 12 of the outer shutter blades overlying the closed segments 9 and 14 of the inner shutter blades, thereby leaving opposite quarters of each shutter open for the passage of light through the exposure apertures 5 and 6, rotation of the drive shaft 20 will result in uniform rotation of the shafts 8 and 13 and the sleeves 10 and 15 and consequently of the shutter blades 7, 9, 12 and 14. If it is desired now, to use but one of the shutters and one of the exposure apertures, for instance, the upper one, it is merely necessary to slide the sleeve 44 inwardly on the shaft 40, thus producing a relative rotation of the shaft 13 with respect to the sleeve 15 resulting in turning the blade 12 with respect to the blade 14 whereby the cut out portion 11 of the blade 14 will be covered by the segment 12 of the outer blade, and of course in such position, the cut out portion 11 of the outer blade 12 will be closed by the segment portions of the inner blade 14.

Thus the continued rotation of the shaft 13 and sleeve 15 with the shutter blades 12 and 14 so disposed, will result in completely covering the lower exposure aperture 6 whereas the upper exposure aperture 5 will be intermittently covered and uncovered by the registering segments and cut out portions of the upper blades 7 and 9. Obviously, if it is desired to use the lower shutter for making the exposures, the sleeve 34 will be moved inwardly instead of the sleeve 44, thus producing a relative rotation of the shutter blade 7 with respect to the inner blade 9, closing such shutter and preventing the passage of light through the exposure aperture 6. If it is desired to use both of the exposure apertures 5 and 6 simultaneously the sleeves 34 and 44 will be moved to the position shown in Figure 4. Likewise, if for any reason, it is desired to close both shutters completely so that the light will not pass through either of the exposure apertures 5 and 6, the sleeves 34 and 44 will both be moved inwardly thus rotating the outer shutter segments 7 and 12 to cover the cut out portions of the inner segments 9 and 14.

Suitable means are provided for shifting the sleeves 34 and 44 and their attendant gears in order to bring about the above described results. Such shifting means is illustrated in Figures 2 and 3 and will now be described.

Suitably journaled at one end in the partition 19 is a screw 50 suitably journaled at its opposite end in the rear wall 30 of the camera. Mounted upon the screw 50 is a threaded shifter 51 provided with a bifurcated extension 52, adapted to embrace the sleeve 34 whereby movement of the shifter 51 along the screw 50 will serve to slide the sleeve 34 and the gears 33 and 36 on the shaft 27. The shifter 51 is provided with an extension 53 having an opening adjacent its end, such opening receiving a pin 54 fixed in the partition 19, whereby to guide the shifter 51 in its movement along the screw 50 and to prevent its rotation with such screw. Obviously, from the construction rotation of the screw 50 will result in movement of the shifter 51 along the screw and consequently, sliding movement of the sleeve 34. The direction of movement of course, depends upon the direction of rotation of the screw 50.

Also suitably rotatably journaled at one end in the partition 19 and at its opposite end in the rear wall 30 of the camera, is a second screw 55 carrying a threaded shifter 56 provided with a bifurcated extension 57, adapted to embrace the sleeve 44 whereby movement of the shifter 56 along the screw 55 will result in sliding the sleeve 44 and the gears 46 and 47 on the shaft 40. The shifter 56 is provided with an extension 58 having an opening 59 adapted to receive a fixed pin 60 extending from the partition 19 whereby the shifter is guided in its movement along the screw 55 and prevented from rotation therewith.

Means are provided for selectively and manually rotating the screws 50 and 55 in order to produce the sliding and shifting movement just described. Such means is identical for each of the screws 50 and 55 and has been illustrated in Figure 3 in detail with respect to screw 55 only. It will be understood, that the rotating means for the screw 50 is identical with that for the screw 55.

Mounted upon the screw 55 adjacent its outer end and just inside the rear wall 30 of the camera, is a pinion 61 meshing with which are the peripheral teeth of a gear 62 secured upon a shaft 63 suitably journaled in a bearing 64 provided on the wall 30 of the camera.

Secured to the outer extending hub 65 of the shaft 63 is one end of a lever crank 66 provided at its free end with a handle or finger piece 67 by means of which it may be rotated. A housing or casing 68 is suitably secured to the outside of the rear wall 30 and encloses all but the extreme free end of the crank lever 66 and its handle 67. This casing 68 is provided with a slit 69 in its flanged side to permit the passage of the crank handle 66 therethrough. Also carried by the hub 65 of the shaft 63 is a dial 70 which may be suitably graduated as at 71, such graduations being visible through a window 72 in the casing 68 whereby to indicate to the operator the position or setting of the shutter blades 12 and 14.

From this description it will therefore, be clear that rotation of the shaft 63 by means of the crank handle 66 will result in rotating the screw 55 through the gears 62 and 61 whereby to move the shifter 56 along the screw 55 and thus varying the position of the shutter blades 12 and 14 in the manner heretofore described.

Likewise, the screw 50 is provided with a pinion 73 meshing with the peripheral teeth of a gear 74 mounted on a shaft (not shown) journaled in a bearing 75 and having its hub extending into a casing 76 in the same manner as above described in connection with the shaft 63.

A crank lever 77 with handle 78 is provided whereby the gear 74 may be rotated. The casing or housing 76 is also provided with a window 79 through which are visible the graduations 80 upon the dial 81 rotatable with the crank lever 77. Rotation therefore of the crank lever 77 will result in rotation of the gear 74 and of the screw 50 thus serving to move the shifter 51 to bring about the relative change of position of the shutter blades 7 and 9 in the manner heretofore described.

It will thus be understood that the operator of the camera may selectively adjust either of the shutters by means of the crank levers 66 and 77 conveniently located on the rear of the camera. By operation of the crank lever 77 he can change the relative position of the shutter blades 7 and 9 whereby to gradually dissolve in or out a scene being photographed through the upper lens 3 and by rotation of the crank lever 66 can dissolve in or out a scene being photographed through the lower lens 4.

It may be desirable however, to simultaneously shift the shutter blades of both of the shutters whereby to fade or dissolve from one scene to another such as from a distant scene to a close up or vice versa. Means are provided for accomplishing this and such means comprise essentially a vertically disposed slidable shaft 82 supported and guided in bearings 83 carried by the inside of the rear wall 30 of the camera. The shaft 82 is provided at its upper end with an elongated gear 84 meshing with the teeth of a crown gear 85 secured upon the face of the gear 74. The elongated gear 84 provides for engagement with the crown gear 85 in both the upper and lower shifted positions of the shaft 82.

Also mounted upon the shaft 82 is a gear 86 so positioned that when the shaft 82 is shifted upwardly it will mesh with the teeth of a crown gear 87 at the upper side of such gear, the crown gear 87 being carried upon the face of the gear 62.

Also secured upon the shaft 82 is a gear 88 so positioned that when the shaft 82 is shifted downwardly, it will engage and mesh with the teeth of the crown gear 87 at the lower side thereof.

The neutral or normal position of the shaft 82 may be considered that shown in Figure 3, namely, with the gears 86 and 88 out of mesh with the crown gear 87, in which position either of the gears 74 or 62, to which the crown gears are attached, may be rotated as afore described to operate the shifters 51 and 56 independently. If however, the parts are in such position and the crank levers 66 and 77 are, as shown in Figures 2 and 3, in which position both the lower and upper shutters are open with respect to the exposure apertures, and it is desired to simultaneously close both of said shutters the shaft may be shifted downwardly to bring the gear 88 into mesh with the crown gear 87, whereupon rotation of either of the crank levers 66 or 77 will result in the simultaneous shifting in the same direction of both the shifters 51 and 56 whereby to accomplish such result in the manner and by the mechanism afore described.

Assume however, that the parts are in the position as shown in Figures 2 and 3, and it is desired that the taking of a scene shall be through the upper exposure aperture 5 only for a certain period and then simultaneously close such upper aperture and open the lower aperture by manipulation of the shutter blades, whereby to dissolve out the picture taken through the upper lens and dissolve in the picture taken through the lower lens, the operator first rotates the crank lever 66 a half turn, thus moving the shifter 56 inwardly and through the mechanism above described, rotate the outer shutter blade 12 so as to close the aperture 6 completely. In this position the operation of the camera obviously permits photographing of a scene through the upper exposure aperture 5 only. The operator may now shift the shaft 82 upwardly, bringing the gear 86 into mesh with the crown gear 87. Now when the proper time arrives to dissolve from the upper lens to the lower lens, rotation by the operator of either of the crank handles 66 or 77 will result in simultaneous movement of the shifters 51 and 56, the former inwardly and the latter outwardly, thus reversing the positions of the blades of the upper and lower shutters. When this scene has been finished and it is desired to dissolve out the same by closing the lower shutter the operator may shift the shaft 82 downwardly to neutral position and then by rotation of the crank lever 66 close the shutter blades 12 and 14 of the lower shutter, in which position both the exposure apertures 5 and 6 will be closed.

The means for shifting the shaft 82 consists in a grooved collar 89 secured upon the shaft 82 and into the groove of which extends a pin 90 carried by a segmental arm 91 secured at one end upon a shaft 92 suitably journaled in the rear wall 30 of the camera and provided at its outer end with a knob 93 whereby the shaft may be rotated.

The opposite free end of the arm 91 is provided with small openings or indentations 94 engageable within which is a suitable friction locking member 95 whereby the shaft 82 may be retained in its adjusted positions.

The shaft 92 may have secured thereto just outside the wall 30, a pointer 96 movable over indicating points or marks 97 on the camera wall to show the operator at a glance, the adjusted position of the shaft 82.

Of course, many changes may be made in details of construction and arrangement of parts without departing from the spirit and scope of my invention. I do not limit myself therefore, to the exact form herein shown and described other than by the appended claims.

1. In combination with a motion picture camera having a plurality of exposure apertures, a rotatable shutter for each aperture comprising relatively adjustable elements adjustable to one position for completely covering the aperture and to another position for alternately covering and uncovering the aperture, and means connected with said shutters for selectively so adjusting either or both of said shutters during rotation thereof, said adjusting means including a unitary member common to both shutters.

2. In combination with a motion picture camera having a plurality of exposure apertures, a rotatable shutter for each aperture comprising relatively adjustable elements adjustable to one position for completely covering the aperture and to another position for alternately covering and uncovering the aperture, and means connected with said shutters for selectively so adjusting said shutters independently or together during rotation thereof said adjusting means including a unitary member common to both shutters.

3. In combination with a motion picture camera having a plurality of exposure apertures, a rotatable shutter for each aperture comprising relatively adjustable elements adjustable to one position for completely covering the aperture and to another position for alternately covering and uncovering the aperture, and means connected with said shutters for so adjusting said shutters simultaneously during rotation thereof said adjusting means including a unitary member common to both shutters.

4. In combination with a motion picture camera having a plurality of exposure apertures, a shutter for each aperture comprising a pair of relatively adjustable axially aligned blades having segments and cut out portions, means for rotating all of said blades together and at the same speed, and means for selectively adjusting the relative position of the blades of each pair or both simultaneously during rotation thereof.

5. In combination with a motion picture camera having a plurality of exposure apertures, a shutter for each aperture comprising a pair of relatively adjustable axially aligned blades having segments and cut out portions, means for rotating all of said blades together and at the same speed, and means for adjusting the relative position of the blades of each pair during rotation thereof, and means for simultaneously adjusting the relative position of the blades of all the pairs during rotation thereof.

6. In combination with a motion picture camera having a plurality of exposure apertures, a shutter for each aperture comprising a pair of relatively adjustable axially aligned blades having segments and cut out portions, means for rotating all of said blades together and at the same speed, and means for simultaneously adjusting the relative position of the blades of all the pairs, during rotation thereof.

7. In combination with a motion picture camera having a plurality of exposure apertures, a shutter for each aperture comprising a pair of relatively adjustable axially aligned blades having segments and cut out portions, a drive shaft, means connected with said shaft for independently and simultaneously rotating all of said blades at the same speed, and means for selectively adjusting the relative position of the blades of any pair during rotation thereof.

8. In combination with a motion picture camera having a plurality of exposure apertures, a shutter for each aperture comprising a pair of relatively adjustable axially aligned blades having segments and cut out portions, a drive shaft, means connected with said shaft for independently and simultaneously rotating all of said blades at the same speed, and means for selectively adjusting the relative position of the blades of any pair during rotation thereof, and means for simultaneously adjusting the relative position of the blades of each pair, during rotation thereof.

9. In combination with a motion picture camera having a plurality of exposure apertures, a shutter for each aperture comprising a pair of relatively adjustable axially aligned blades having segments and cut out portions, a drive shaft, means connected with said shaft for independently and simultaneously rotating all of said blades at the same speed, and means for simultaneously adjusting the relative position of the blades of each pair, during rotation thereof.

10. In combination with a motion picture camera having a plurality of exposure apertures, a shutter for each aperture comprising a pair of relatively adjustable axially aligned blades rotatably mounted and having segments and cut out portions, gears for rotating said blades, a drive shaft, means comprising intermeshing gears connected with said shaft and said first named gears for independently and simultaneously rotating all of said blades at the same speed, and means for shifting certain of said gears for selectively adjusting the relative position of the blades of any pair.

11. In combination with a motion picture camera having a plurality of exposure apertures, a shutter for each aperture comprising a pair of relatively adjustable axially aligned blades rotatably mounted and having segments and cut out portions, gears for rotating said blades, a drive shaft, means comprising intermeshing gears connected with said shaft and said first named gears for independently and simultaneously rotating all of said blades at the same speed, and means for shifting certain of said intermeshing gears to rotate certain of said blades for selectively adjusting the relative position of the blades of any pair, during rotation.

12. In combination with a motion picture camera having a plurality of exposure apertures, a shutter for each aperture comprising a pair of relatively adjustable axially aligned blades rotatably mounted and having segments and cut out portions, gears for rotating said blades, a drive shaft, means comprising intermeshing gears connected with said shaft and said first named gears for independently and simultaneously rotating all of said blades at the same speed, and means for shifting certain of said intermeshing gears to rotate certain of said blades for selectively adjusting the relative position of the blades of any pair, during rotation, said shifting means including shifters controlled independently and exteriorly of the camera.

13. In combination with a motion picture camera having a plurality of exposure apertures, a shutter for each aperture comprising a pair of relatively adjustable axially aligned blades rotatably mounted and having segments and cut out portions, gears for rotating said blades, a drive shaft, means comprising intermeshing gears connected with said shaft and said first named gears for independently and simultaneously rotating all of said blades at the same speed, and means for shifting certain of said intermeshing gears to rotate certain of said blades for selectively adjusting the relative position of the blades of any pair, during rotation, said shifting means including shifters controlled independently and exteriorly of the camera, and means for connecting said shifters, whereby they may operate simultaneously.

14. In combination with a motion picture camera having a plurality of exposure apertures, a shutter for each aperture comprising a pair of relatively adjustable axially aligned blades rotatably mounted and having segments and cut out portions, gears for rotating said blades, a drive shaft, means comprising intermeshing gears connected with said shaft and said first named gears for independently and simultaneously rotating all of said blades at the same speed, and means for shifting certain of said intermeshing gears to rotate certain of said blades for selectively adjusting the relative position of the blades of any pair, during rotation, said shifting means including shifters controlled independently and exteriorly of the camera, and means for connecting said shifters, whereby they may operate simultaneously, and indicating means for the position of said connecting means.

FREEMAN H. OWENS.